INVENTOR
LESTER R. MUMMERY

INVENTOR
LESTER R. MUMMERY

United States Patent Office 3,367,222
Patented Feb. 6, 1968

3,367,222
CUTTING APPARATUS WITH CONTINUOUSLY ADJUSTED BED-KNIFE
Lester R. Mummery, Kinston, N.C., assignor to E. I. du Pont de Nemours and Company, Wilmington, Del., a corporation of Delaware
Filed Feb. 15, 1966, Ser. No. 527,609
1 Claim. (Cl. 83—174)

This invention relates to apparatus for cutting of continuous synthetic filamentary material into short lengths, and is more particularly concerned with an improvement in a rotary cutter for maintaining optimum brushing contact between the cutter blades and the bed-knife.

Most staple cutters are unsuitable for commercial use in the production of flock because of the extremely short cut lengths of this product (about 1/16 inch to about 3/4 inch in length). A suitable flock cutter is disclosed in Billingsley et al. U.S. Patent No. 3,119,294, issued Jan. 28, 1964, which resembles a reel-type lawnmower. In this type of cutter, several blades are mounted on a single rotor, frequently in a canted or helical disposition. The rotor revolves the blades sequentially into contact with a stationary bed-knife while filamentary tow is fed across the bed-knife at a rate so regulated with respect to the frequency of knife-passage as to result in the proper cut length. The scissors-like action of such cutters results in self-sharpening of the blades in their contact with the bed-knife if suitable materials are employed and if the proper pressure of contact is maintained. Contact pressure is diminished with blade and/or bed-knife wear, resulting in less than optimum pressure of contact, missed cuts, and dull blades. A means for maintaining the optimum contact pressure between blades and bed-knife during continuous operation would be highly desirable.

This invention provides means for continuously advancing the bed-knife of a flock cutter at a rate which approximates the wear rate. Other advantages will be recognized as the description of the invention proceeds.

Figure 1:
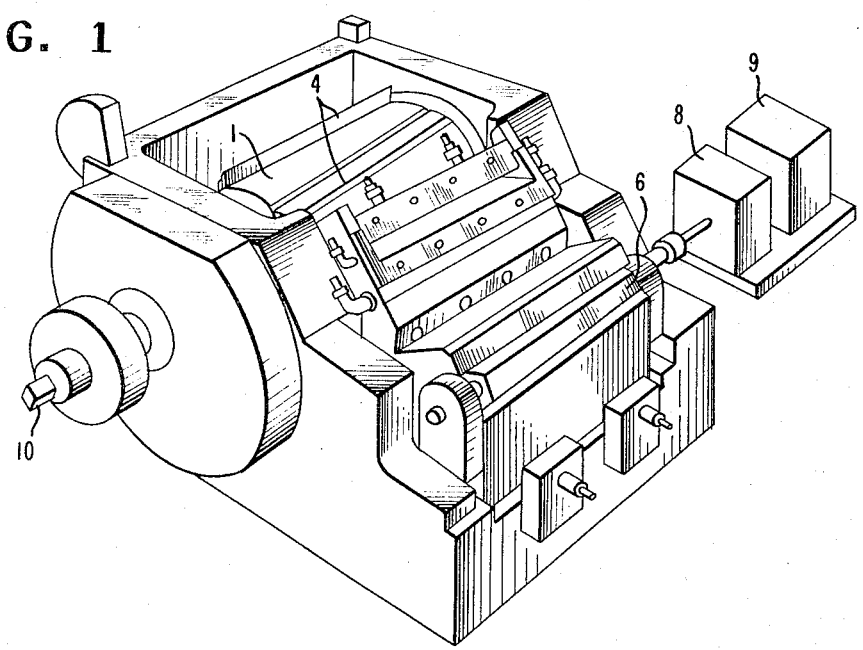
Figure 2:
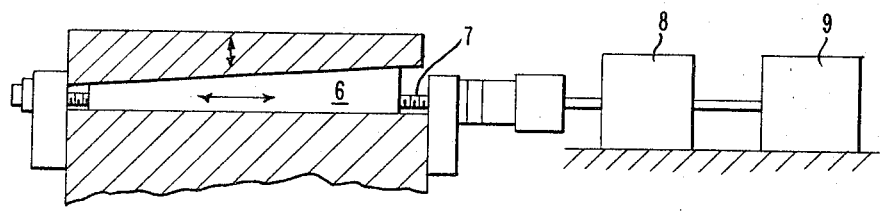

These advantages are provided by an improvement in the flock cutter of the above U.S. Patent No. 3,119,294, the disclosure of which is relied upon for a more complete understanding of the construction. That apparatus is provided with wedge means for moving the bed-knife toward the revolving blades and screw means for manually adjusting the position of the wedge. The present invention is in the combination with the flock cutter of a variable speed motor and gear means for reducing the motor speed to turn said screw means at an almost imperceptible speed for advancing the bed-knife toward the revolving blades continuously during the cutting operation. It has been found that the speed of the motor can be set to advance the bed-knife toward the revolving blades at a rate which will effectively compensate for wear in order to maintain the proper contacting relationship. Since an extremely slow and precise rate of bed-knife advancement in the range of 0.00005 to 0.0003 inch per hour is required, depending upon the blades and bed-knife used and the material being cut, it is surprising that adjustment can be accomplished automatically. This invention will more readily be understood by reference to the figures in which FIGURE 1 is an isometric, schematic representation of one embodiment and FIGURE 2 is an elevation schematic, partly in cross-section as indicated by line 2—2 in FIGURE 3, illustrating means for adjustment, and FIGURE 3 is an elevation cross-section of this embodiment illustrating the relationship between bed-knife and rotor.

Figure 3:
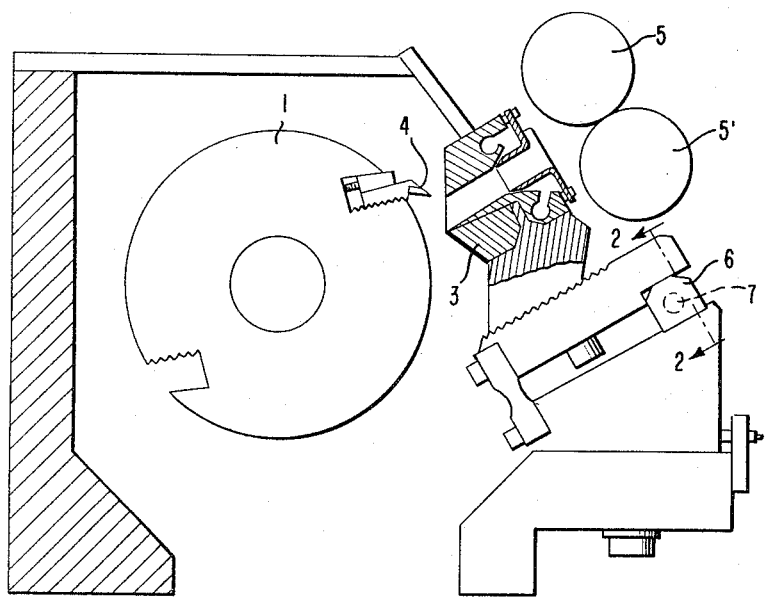

With reference to FIGURE 3, rotor 1, bearing a multiplicity of helically mounted blades 4, is rotated against a bed-knife 3 while tow is metered into the nip between the bed-knife and blades by metering rolls 5 and 5'. Bed-knife 3 is moved toward the revolving blades by adjusting wedge 6, seen more clearly in FIGURE 2. Wedge 6 is mounted on screw 7 which is driven by gear box 8. Gear box 8 is driven by variable speed motor 9. The variable speed motor may conveniently be a D.C. motor. Its speed is then determined by the voltage which may be varied by any of several means available in the art. Alternatively, a rheostat may be employed to vary the speed of an A.C. motor. A total gear reduction of about 2000 to 1 between the motor and the screw 7 is desirable.

It has been found that an experienced operator can judge when proper pressure in the brushing contact between rotating knives and bed-knife has been attained by the sound of their contact during normal operation of the cutter. With the improved apparatus of this invention, it is a simple matter to advance the bed-knife toward the cutters until the contact is judged to be satisfactory and then to set the rate of advance to that which has been found by experience to be about right for a given operation. The optimum rate of advance can be empirically determined for any given pair of materials employed for the blades and the bed-knife, respectively. The type fiber being cut will also influence dulling rate and also must be taken into account in determining the optimum rate of bed-knife advance.

It is within the scope of this invention to advance the bed-knife manually and intermittently as required during the cutting operation, such as by operating the advance device a given number of minutes out of each hour. It is preferred to interlock, by either mechanical or electrical means, the drives or the controls of the two operations such that the bed-knife will be advanced at a previously established rate at all times during which the cutting operation is in progress. A further embodiment can be visualized in which the bed-knife is advanced at a rate which is contingent on requirements. In this embodiment, the rotating knives are driven by an electric motor through shaft 10, the motor being so selected as to have no great excess of power beyond that required to drive the unit. The resistance developed by contact of blades 4 with bed-knife 3 is reflected in the power required to rotate the cutter. This power is measured by an ammeter, a signal from which is employed in a known manner to actuate D.C. motor 9, as required, to advance the bed-knife toward the rotor. A low-power signal actuates the advance device and a higher power signal stops advancing the bed-knife.

It will be obvious to one skilled in the art that there are many variations of this simple, yet effectual, means for improvement of flock quality which may be made without departing from the scope of this invention. It is intended, therefore, that the invention not be limited except as indicated in the appended claim.

I claim:
1. In an apparatus for cutting a tow of continuous synthetic filaments into flock, of the rotating reel type comprising a plurality of blades mounted on a rotor, an adjustable bed-knife across which the blades are revolved so as to make brushing contact for cutting tow fed across the bed-knife, wedge means for moving the bed-knife toward the revolving blades, and screw means for adjusting the position of the wedge means; the improvement, for maintaining the blades and bed-knife in contacting relationship during continuous operation, of a variable speed motor and gear means to reduce the motor speed by 2000 to 1 in combination with said screw means for advancing said bed-knife toward the revolving blades continuously during the cutting operation at a rate which will compensate for wear.

References Cited
UNITED STATES PATENTS

| | | | |
|---|---|---|---|
| 2,822,844 | 2/1958 | Busch | 83—174 X |
| 2,829,692 | 4/1958 | Innocenti | 83—174 |
| 3,119,294 | 1/1964 | Billingsley et al. | 83—174 |
| 3,238,828 | 3/1966 | McNutt | 83—913 X |

ANDREW R. JUHASZ, *Primary Examiner.*